Patented Oct. 18, 1927.

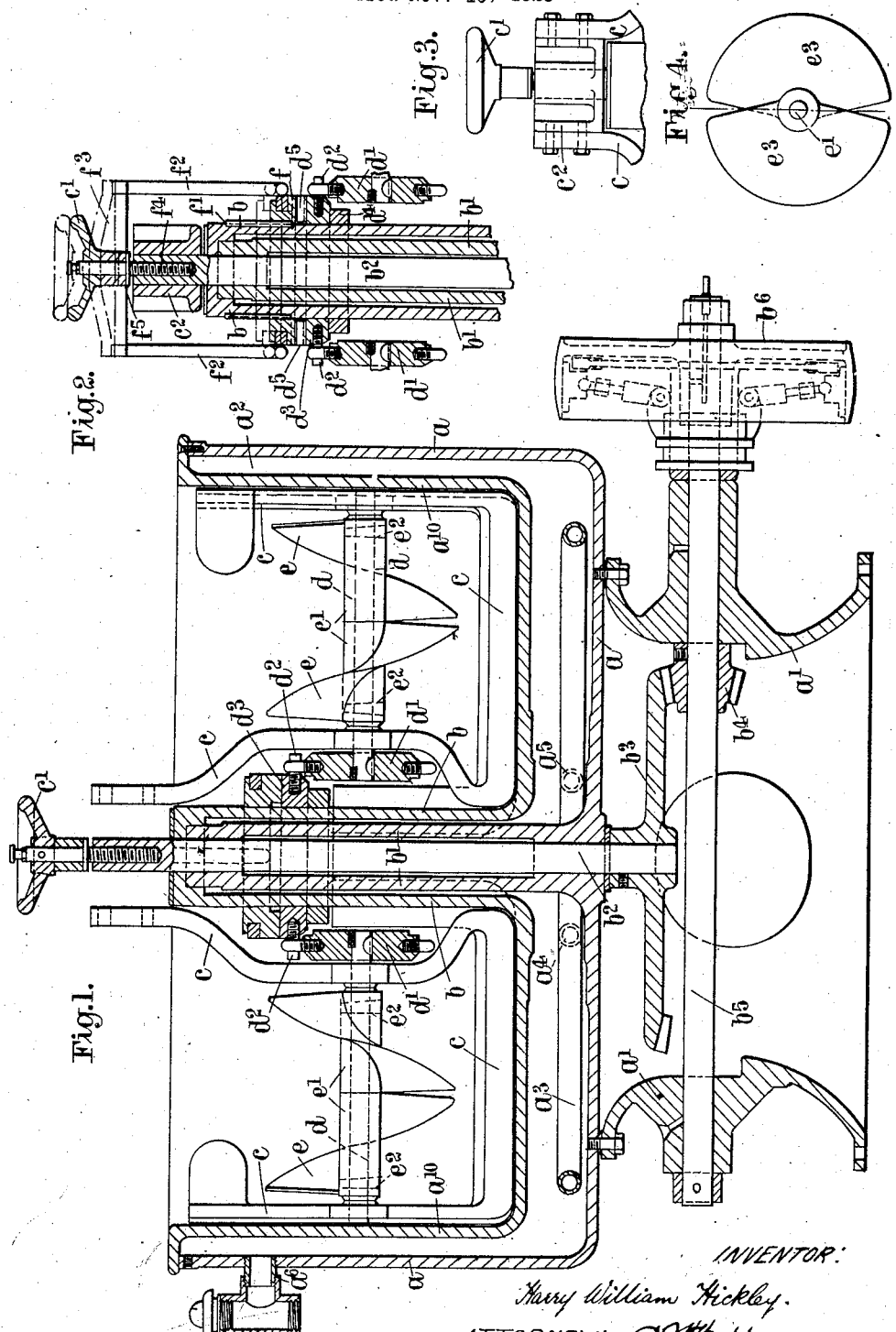

1,645,990

UNITED STATES PATENT OFFICE.

HARRY WILLIAM HICKLEY, OF LONDON, ENGLAND, ASSIGNOR, BY MESNE ASSIGNMENTS, TO BAKER PERKINS COMPANY, INC., OF SAGINAW, MICHIGAN, A CORPORATION OF NEW YORK.

VESSEL FOR MIXING CHOCOLATE AND SIMILAR SUBSTANCES.

Application filed November 19, 1923, Serial No. 675,648, and in Great Britain November 21, 1922.

This invention relates to vessels or "kettles" for mixing chocolate and similar substances and of that class which include or comprise a stationary container, jacketed or provided with other means for tempering the contents and containing one or more stirring devices or "paddles" which rotate about a vertical axis within the container and are themselves revolved to impart a stirring or beating action on the contents.

In such devices paddles or stirrers have been proposed in the form of relatively narrow arms given a helicoidal or equivalent shape by which the contents of the container is given a lateral or undulatory flow or direction, that is to say, from the centre outwards and back again in the course of rotation of the paddles, but such constructions have the tendency to beat air into the contents when the latter is at a substantially low level in the container, which in the case of chocolate, is highly undesirable for the production of high class goods of fine finish since this beating of air forms bubbles and inequalities in the finished product.

The present invention comprises a novel form of apparatus for mixing chocolate and similar substances comprising a plurality of substantially U-shaped stirring frames mounted in a receptacle, said stirring frames conforming to the inner contour of said receptacle, the outer leg of each of said stirring frames being of a length substantially equal to the depth of the receptacle, with a stirring element mounted in each of said stirring frames and spaced with respect to the bottom of the receptacle, said stirring elements being each constructed to cause the material being operated upon to move in opposite directions radially of the container, means being provided for driving the stirring frames in a circular path in said receptacle, and means for rotating said stirring elements in their respective frames during their movement through the receptacle.

The receptacle may also have a centrally disposed hollow pedestal, each of said stirring frames having one leg conforming in shape to the shape of the outer wall of the receptacle and extending in length substantially throughout the height of the side wall of the receptacle, and a leg conforming in shape to the hollow pedestal of the receptacle, the said stirring elements being each constructed to move the material in opposite directions radially of the container from a point substantially central with respect to the side wall of the container and the hollow pedestal when rotated about a horizontal axis.

An embodiment is illustrated in the accompanying drawings in which Fig. 1 is a vertical section of a conventional form of chocolate "kettle" provided with two beaters of duplex form according to the present invention, certain driving connections being removed.

Fig. 2 is a sectional detail view of the driving connections for the stirring frame and paddles. Fig. 3 is a detail view of a driving connection and Fig. 4 is a side elevation of one of the paddles or beaters.

In said drawings $a$ designates the "kettle" carried by a base casting $a^1$ and provided with a water jacket $a^2$ in which is located a coil $a^3$ for reception of steam or other tempering medium which has inlet at $a^4$ and outlet at $a^5$. An overflow for water from the jacket is indicated at $a^6$. The inner container $a^{10}$ has a central hollow sleeve or boss $b$ in which fits another sleeve $b^1$ which in turn receives a shaft $b^2$ driven by bevel gear $b^3$ $b^4$ from a main drive shaft $b^5$ on which is mounted a driving pulley $b^6$.

Within the container $a$ is a rotary stirring frame $c$ carrying the paddle shafts $d$, this frame being given its rotation by means of a driving yoke $c^2$ bolted thereto (Figs. 2 and 3) and mounted on the shaft $b^2$. By the rotation of the frame $c$ the paddle shafts $d$ are axially revolved by means of pin wheels $d^1$ on their shafts engaging studs $d^2$ extending from a sprocket $d^3$ loosely mounted on the sleeve $b$ and bearing on a collar $d^4$ fixed on said sleeve. The sprocket $d^3$ is provided with dog teeth $d^5$ with which normally engage similar dog teeth on a ring $f$ slidable on keys $f^1$ on the sleeve $b$, the said ring being connected to rods $f^2$ themselves connected above by a cross head $f^3$ through which passes a screw $f^4$ having a collar $f^5$ below the cross head and threaded into the end of the shaft $b^2$. The screw is provided at its upper end with a hand wheel $c^1$. By rotating the latter the cross head $f^3$ and rods $f^2$ will be lifted, in turn raising the ring $f$ and disengaging the dog teeth between the rings $f$ and $d^3$ thus freeing the latter from the driving connection for disengaging the ring $d^3$ when it is desired to arrest the rotation of the paddles.

The above construction is a substantially known one and is given as an example only but it will be seen that as the stirring frame rotates, the paddles on the shafts $d$ will be axially revolved to mix and further stir the chocolate.

The form of paddle of the present invention is clearly illustrated in the drawings. It will be seen that each paddle comprises two members $e$ constituting between them a complete helix. Where two complete paddles are used as illustrated the paddle at one side of the container would with advantage be of opposite pitch, to that of the other side so as to obtain the advantageous inward and outward flow of the chocolate during the revolution of the paddles and their supporting frame.

Each paddle member comprises a boss $e^1$ of substantial thickness secured by one or more taper pins $e^2$ to the shaft $d$, and from said boss extends a solid helicoidal blade $e^3$ the pitch line or contour of which constitutes approximately half a helix as clearly shown in Fig. 2 from which figure it will also be seen that where two such members are used they are arranged on opposite sides of a vertical plane passing through the axis of the paddle shaft $d$, the inner portions of the blades overlapping to some extent adjacent the boss $e^1$ and diverging towards the peripheries.

From the above description of the paddles it will be clear that they will act to mix and stir the contents of the container in a highly efficient manner since their blades will cleanly enter the material under treatment without violent contact or impact and will leave same without undue disturbance or separation thereof thus obviating the entrance of air to the greatest extent possible.

What I claim as my invention and desire to secure by Letters Patent of the United States is:—

1. In apparatus for mixing chocolate and similar substances, a receptacle, a plurality of substantially U-shaped stirring frames mounted in said receptacle, said stirring frames conforming to the inner contour of said receptacle, the outer leg of each of said stirring frames being of a length substantially equal to the depth of the receptacle, a stirring element mounted in each of said stirring frames and spaced with respect to the bottom of the receptacle, said stirring elements being each constructed to cause the material being operated upon to move in opposite directions radially of the container, means for driving the stirring frames in a circular path in said receptacle, and means for rotating said stirring elements in their respective frames during their movement through the receptacle.

2. In apparatus for mixing chocolate and similar substances comprising a receptacle having a centrally disposed hollow pedestal, a plurality of substantially U-shaped stirring frames removably mounted in said receptacle, each of said stirring frames having one leg coforming in shape to the shape of the outer wall of the receptacle and extending in length substantially throughout the height of the side wall of the receptacle, and a leg conforming in shape to the hollow pedestal of the receptacle, means for driving said stirring frames in a circular path in said receptacle about a vertical axis, a stirring element mounted in each of said stirring frames and spaced with respect to the bottom wall of said receptacle, said stirring elements being each constructed to move the material in opposite directions radially of the container from a point substantially central with respect to the side wall of the container and the hollow pedestal when rotated about a horizontal axis, and means for rotating said stirring elements about a horizontal axis.

In witness whereof I have signed this specification.

HARRY WILLIAM HICKLEY.